United States Patent
Sugimoto et al.

(10) Patent No.: US 6,243,629 B1
(45) Date of Patent: Jun. 5, 2001

(54) ELECTRONIC CONTROL UNIT FOR AUTOMOTIVE VEHICLES

(75) Inventors: Yoshiyuki Sugimoto; Yusuke Takayama, both of Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/391,944

(22) Filed: Sep. 8, 1999

Related U.S. Application Data

(63) Continuation-in-part of application No. 08/807,206, filed on Feb. 28, 1997, now abandoned.

(30) Foreign Application Priority Data

Apr. 19, 1996 (JP) .................................................. 8-120838

(51) Int. Cl.⁷ .................................................. G05B 9/02
(52) U.S. Cl. .............................. 701/29; 701/33; 701/76; 701/92; 303/122.05
(58) Field of Search .................................. 701/29, 33, 76, 701/92; 180/197; 303/122, 122.01, 122.02, 122.03, 122.04, 122.05, 122.06

(56) References Cited

U.S. PATENT DOCUMENTS

| | | | |
|---|---|---|---|
| 5,001,641 | 3/1991 | Makino | 701/76 |
| 5,074,626 | 12/1991 | Kramer et al. | 701/76 |
| 5,193,887 | 3/1993 | Bleckmann et al. | 701/76 |
| 5,490,072 | 2/1996 | Hornback | 701/76 |
| 5,493,495 | 2/1996 | Naito et al. | 701/76 |
| 5,526,264 | 6/1996 | Niggemann et al. | 701/76 |
| 5,684,702 | 11/1997 | Phillips et al. | 701/76 |
| 5,832,395 | 11/1998 | Takeda et al. | 701/33 |

FOREIGN PATENT DOCUMENTS

| | | |
|---|---|---|
| 2-296570 | 12/1990 | (JP) . |
| 4-31123 | 5/1992 | (JP) . |

*Primary Examiner*—Gary Chin
(74) *Attorney, Agent, or Firm*—Frishauf, Holtz, Goodman, Langer & Chick, P.C.

(57) ABSTRACT

An electronic control unit for an automotive vehicle which can be manufactured at a low cost and which is compact in size, includes a first microprocessor which has a first memory storing one of a plurality of arithmetic programs for controlling respective predetermined control systems, and which is connected to at least one external sensor and an actuator of a corresponding one of the predetermined control systems. The first microprocessor arithmetically processes information from the at least one external sensor based on the one of the plurality of predetermined arithmetic programs stored in the first memory, and delivers a control signal as a result of the arithmetic processing to the actuator. A second microprocessor is connected to the first microprocessor to deliver and receive data to and from the first microprocessor, thereby monitoring operation of the same. The second microprocessor includes a second memory which stores both check data for checking the operation of the first microprocessor, based on which the first microprocessor executes predetermined arithmetic processing, and solutions determined by the check data. The check data is commonly applicable for all of the plurality of predetermined arithmetic programs. The second microprocessor also includes a determining block which compares between results of the predetermined arithmetic processing executed by the first microprocessor based on the check data and the solutions, and determines that an abnormality exists in the first microprocessor when the results of the predetermined arithmetic processing and the solutions do not agree.

7 Claims, 5 Drawing Sheets

ELECTRONIC CONTROL UNIT FOR AUTOMOTIVE VEHICLES

CROSS-REFERENCE TO RELATED APPLICATIONS

This present application is a continuation-in-part of U.S. patent application Ser. No. 08/807,206 filed on Feb. 28, 1997 for ELECTRONIC CONTROL UNIT FOR AUTOMOTIVE VEHICLES, now abandoned. The disclosure of that application is specifically incorporated herein by reference.

BACKGROUND OF INVENTION

1. Field of the Invention

This invention relates to an electronic control unit for automotive vehicles, and more particularly, such an electronic control unit for performing a fail-safe function so as to control systems or apparatuses to be controlled by the control unit with improved reliability.

2. Prior Art

An anti-lock braking system (hereinafter referred to as "ABS") which is conventionally widely used in automotive vehicles operates to release the brake pressure of a brake system of the automotive vehicle upon detecting of the start of locking of a wheel or wheels in response to data from a wheel speed sensor and a vehicle speed estimated from the data, to thereby restrain slippage of the vehicle wheel (s), thus enhancing the braking function and hence maintaining stability of the vehicle so that the vehicle can be stopped safely. In the anti-lock system, it is important to enhance the reliability of the system itself. To this end, conventionally, an electronic control unit (hereinafter referred to as "ECU") is employed in the ABS system, which is provided with two central processing units (hereinafter referred to as "CPUs") for synchronously performing the same arithmetic processing in response to a common input signal and a common clock signal, wherein only when results of the arithmetic processing executed by the both CPUs are the same, an output signal is generated and delivered to a system or an apparatus to be controlled, thus enhancing the reliability of the system, as disclosed in Japanese Patent Publication (Kokoku) No. 4-31123. That is, in the system provided with two CPUs, one CPU plays a role of a redundancy circuit for the other CPU to provide a fail-safe control.

This conventional ECU, however, is costly because the ECU must be provided with two CPUs.

To overcome this drawback, there has been proposed an improvement on the above dual CPU system, wherein the relationship between the two CPUs is set such that one CPU works as a main CPU while the other CPU works as a sub CPU, as disclosed in Japanese Laid-Open Patent Publication (Kokai) No. 2-296570. The main CPU executes a main original control of a system to be controlled while the sub CPU monitors whether the main CPU is operating normally or not. Therefore, the sub CPU is merely provided with logic circuits which are necessary for monitoring the operation of the main CPU and executes a simpler arithmetic processing compared to that of the main CPU.

The conventional ECU which is provided with the main CPU and the sub CPU will be explained in detail hereinbelow with reference to FIG. 1 schematically showing the arrangement of the conventional ECU for a automotive vehicle.

As shown in FIG. 1, the ECU is provided with a main CPU 1 and a sub CPU 2. An output of a wheel speed sensor 3 is connected to an input of the main CPU 1 by way of a signal line 4, while an input of an OR circuit 6 is connected to an output of the main CPU 1 by way of a signal line 5. Another output of the wheel speed sensor 3 is connected to an input of the sub CPU 2 by way of a signal line 7, and another input of the OR circuit 6 is connected to an output of the sub CPU 2 by way of a signal line 25. An output of the OR circuit 6 is connected to a fail-safe relay 8 and an alarm lamp 9 by way of a signal line 11. The fail-safe relay 8, when operated, cuts off the supply of electric power to a solenoid valve 10 as explained later, and the alarm lamp 9, when operated, warns an occurrence of abnormality in the ABS control to the driver, as explained later.

The main CPU 1 has a memory means 12 which stores control programs for carrying out logical operations executed by the main CPU 1.

The main CPU is a microprocessor provided with a CPU core 13 which performs arithmetic processing on control programs. The CPU core 13 includes a wheel speed signal-processing block 14 which executes necessary processing such as filtering of a wheel speed signal WS generated by the wheel speed sensor 3 and calculates a vehicle speed signal VS based on the filtered signal, an ABS control block 15 which executes ABS control processing in response to the wheel speed signal WS and the vehicle speed signal VS, and a solenoid valve control block 16 which controls the solenoid valve 10 in response to a control signal fed from the ABS control block 15. The output of the main CPU 1 is connected to the solenoid valve 10 by way of a communication line 17. The solenoid valve 10 regulates the brake pressure of a brake system of the vehicle applied to wheels in response to the control signal fed from the solenoid valve control block 16. The operative state of the solenoid valve 10 is transmitted to the main CPU 1 and the sub CPU 2 by way of communication lines 18 and 19.

The sub CPU 2 is a microprocessor which monitors the entire system including the main CPU. The sub CPU 2 is provided with a CPU core 20 which corresponds to the CPU core 13 of the main CPU 1. The CPU core 20 includes a vehicle speed signal-processing block 14', an ABS partial control block 21 and a solenoid valve-monitoring block 22 which correspond, respectively, to the wheel speed signal processing block 14, the ABS control block 15 and the solenoid valve control block 16 which are included in the CPU core 13.

The wheel speed signal-processing block 14' executes the same processing as that of the wheel speed signal-processing block 14 of the main CPU 1. The ABS partial control block 21 executes arithmetic processing necessary exclusively for monitoring the operation of the ABS control block 15 of the CPU 1 but does not execute ABS control. The solenoid valve-monitoring block 22 executes only monitoring of the operation of the solenoid valve 10 but does not execute control of the operation of the solenoid valve 10.

The main CPU 1 and the sub CPU 2 are connected with each other by way of communication lines 23 and 24 for transmitting and receiving data therebetween.

The operation of the conventional ECU constructed above will be described hereinbelow.

The wheel speed signal WS is fed both to the main CPU 1 and the sub CPU 2 from the wheel speed sensor 3 by way of the respective signal lines 4 and 7. Upon receiving the signal WS, the main CPU 1 executes the following processing based on control programs stored in the memory means 12:

The wheel speed signal processing unit 14 processes the wheel speed signal WS from the wheel speed sensor 3.

During this processing, if an abnormality is found in the output from the wheel speed sensor 3, the processing unit 14 delivers a fail-safe signal to the OR circuit 6 by way of the signal line 5.

The ABS control block 15 executes arithmetic processing related to the ABS control in response to the wheel speed signal WS processed by the wheel speed signal processing unit 14 and the vehicle speed signal VS estimated from the wheel speed signal WS. During this processing, if an abnormality is found in the operation of the ABS control block 15, the control block 15 delivers a fail-safe signal to the OR circuit 6 by way of the signal line 5.

The solenoid valve control block 16 operates based on results of the calculation by the ABS control block 15 and a response from the solenoid valve 10 which will be described later, to deliver a control signal to the solenoid valve 10 by way of the communication line 17 so as to control the operation of the solenoid valve 10. During this processing, if an abnormality is found in the control of the solenoid valve 10, the control block 16 delivers a fail-safe signal to the OR circuit 6 by way of the signal line 5.

The solenoid valve 10 regulates the brake pressure in response to the control signal transmitted from the solenoid control block 16 and delivers a signal indicative of its own operative state which reflects its response to the control signal to the main CPU 1 and the sub CPU 2, respectively, by way of the communication lines 18 and 19.

The OR circuit 6 activates the fail-safe relay 8 and turns on the alarm lamp 9 by way of the signal line 11 in response to the fail-safe signals fed to the OR circuit 6, respectively, from the wheel speed signal-processing block 14, the ABS control block 15 and the solenoid valve control block 16.

In the sub CPU 2, the following processing is executed:

The wheel speed signal-processing block 14' processes the wheel speed signal WS fed from the wheel speed sensor 3. During this processing, if an abnormality is found in the output from the wheel speed sensor 3, the processing block 14' delivers a fail-safe signal to the OR circuit 6 by way of the communication line 25. This processing is almost the same as that of the wheel speed signal processing block 14 of the CPU 1. In this sense, the processing block 14 constitutes a redundancy circuit for the wheel speed signal processing unit 14.

The ABS partial control block 21 executes data communication with the CPU 1 by way of the communication lines 23 and 24. Namely, in response to the wheel speed signal WS processed by the wheel speed signal processing block 14 and the vehicle speed signal VS estimated from the processed wheel speed signal WS, the ABS partial control block 21 executes arithmetic processing necessary for monitoring the operation of the ABS control unit 15 and checks whether or not results of the arithmetic processing executed by the ABS partial control block 21 and results of the arithmetic processing executed by the ABS control block 15 of the CPU 1 coincide with each other. If they do not coincide with each other, the ABS partial control block 21 delivers a fail-safe signal to the OR circuit 6 by way of the communication line 25.

The solenoid valve-monitoring block 22 monitors the operation of the solenoid valve 10, and if an abnormality is detected in the operation of the solenoid valve 10, the monitoring block 22 delivers a fail-safe signal to the OR circuit 6 by way of the communication line 25.

The OR circuit 6 activates the fail-safe relay 8 and turns on the alarm lamp 9 by way of the signal line 11 in response to the fail-safe signals fed to the OR circuit 6, respectively, from the wheel speed signal-processing block 14', the ABS partial control block 21 and the solenoid valve-monitoring block 22. Further, in the above-mentioned fail-safe processing by each block, the main CPU 1 delivers an output-inhibiting signal to the solenoid valve 10 so as to turn off the solenoid valve 10.

According to the conventional ECU described above, to monitor the operation of the main CPU 1, the sub CPU also must be a type of CPU having a sufficient processing capability to execute a complicated arithmetic processing though the level of such processing capability is not as high as that of the main CPU 1. In the prior art, in respect of the hardware structure of the ECU including the processor, ROM, RAM and the casing, the sub CPU 2 has almost the same structure as that of the main CPU 1 as in the case of dual main CPU system. Therefore, to apply the ECU to control other systems such as ABS, an electronic fuel injection control system (EFI) or a traction control system (TCS), the sub CPU 2 must have a different arithmetic processing logic corresponding to the specifications of the main CPU 1.

Therefore, the conventional ECU is still costly though it is less expensive compared to the dual CPU structure.

SUMMARY OF THE INVENTION

It is an object of the invention to provide an electronic control unit for an automotive vehicle which can be manufactured at low costs and compact in size.

To attain the above object, the present invention provides an electronic control unit for an automotive vehicle, comprising:

a microprocessor having first memory means storing an arithmetic program for controlling a predetermined control system, the microprocessor being connected to at least one external sensor and an actuator of the control system, for arithmetically processing information from the at least one external sensor based on the arithmetic program stored in the first memory means, and for delivering a control signal as results of the arithmetic processing to the actuator; and monitoring means connected to the microprocessor, for delivering and receiving data to and from the microprocessor and thereby monitoring operation of the microprocessor;

wherein the monitoring means includes second memory means storing check data for checking the operation of the microprocessor, based on which the microprocessor executes predetermined arithmetic processing, and solutions determined by the check data, and determining means for comparing between results of the predetermined arithmetic processing executed by the microprocessor based on the check data and the solutions stored in the second memory means, and for determining that an abnormality exists in the microprocessor when the results of the predetermined arithmetic processing and the solutions do no agree.

Preferably, the monitoring means includes means connected to the actuator of the control system, for outputting a signal commanding inhibition of operation of the actuator when the determining means determines that an abnormality exists in the microprocessor.

Also preferably, the electronic control unit, includes means for inputting a signal indicative of operation of the actuator to the monitoring means.

More preferably, the monitoring means includes means connected to the means for inputting the signal indicative of the operation of the actuator to the monitoring means, for outputting a signal commanding inhibition of operation of the actuator when the signal indicative of the operation of the actuator indicates that an abnormality exists in the actuator.

Preferably, the electronic control unit includes means for inputting a signal indicative of operation of the at least one external sensor to the monitoring means.

More preferably, the monitoring means includes means connected to the means for inputting the signal indicative of the operation of the at least one external sensor to the monitoring means, for outputting a signal commanding inhibition of operation of the actuator when the signal indicative of the operation of the at least one external sensor indicates that an abnormality exists in the at least one external sensor.

In a preferred embodiment of the invention, there is provided an electronic control unit for an automotive vehicle, comprising:

a first microprocessor having first memory means storing an arithmetic program for controlling a predetermined control system, the first microprocessor being connected to at least one external sensor and an actuator of the control system, for arithmetically processing information from the at least one external sensor based on the arithmetic program stored in the first memory means, and for delivering a control signal as results of the arithmetic processing to the actuator; and a second microprocessor connected to the first microprocessor, exclusively for delivering and receiving data to and from the first microprocessor and thereby monitoring operation of the first microprocessor;

wherein the first microprocessor includes second memory means storing check data for checking the operation of the first microprocessor, based on which the first microprocessor executes predetermined arithmetic processing, and solutions determined by the check data, and determining means for comparing between results of the predetermined arithmetic processing executed by the first microprocessor based on the check data and the solutions stored in the second memory means, and for determining that an abnormality exists in the first microprocessor when the results of the predetermined arithmetic processing and the solutions do no agree.

The above and other objects, features, and advantages of the invention will be more apparent from the following detailed description taken in conjunction with the accompanying drawings.

DETAILED DESCRIPTION

Figure 1:
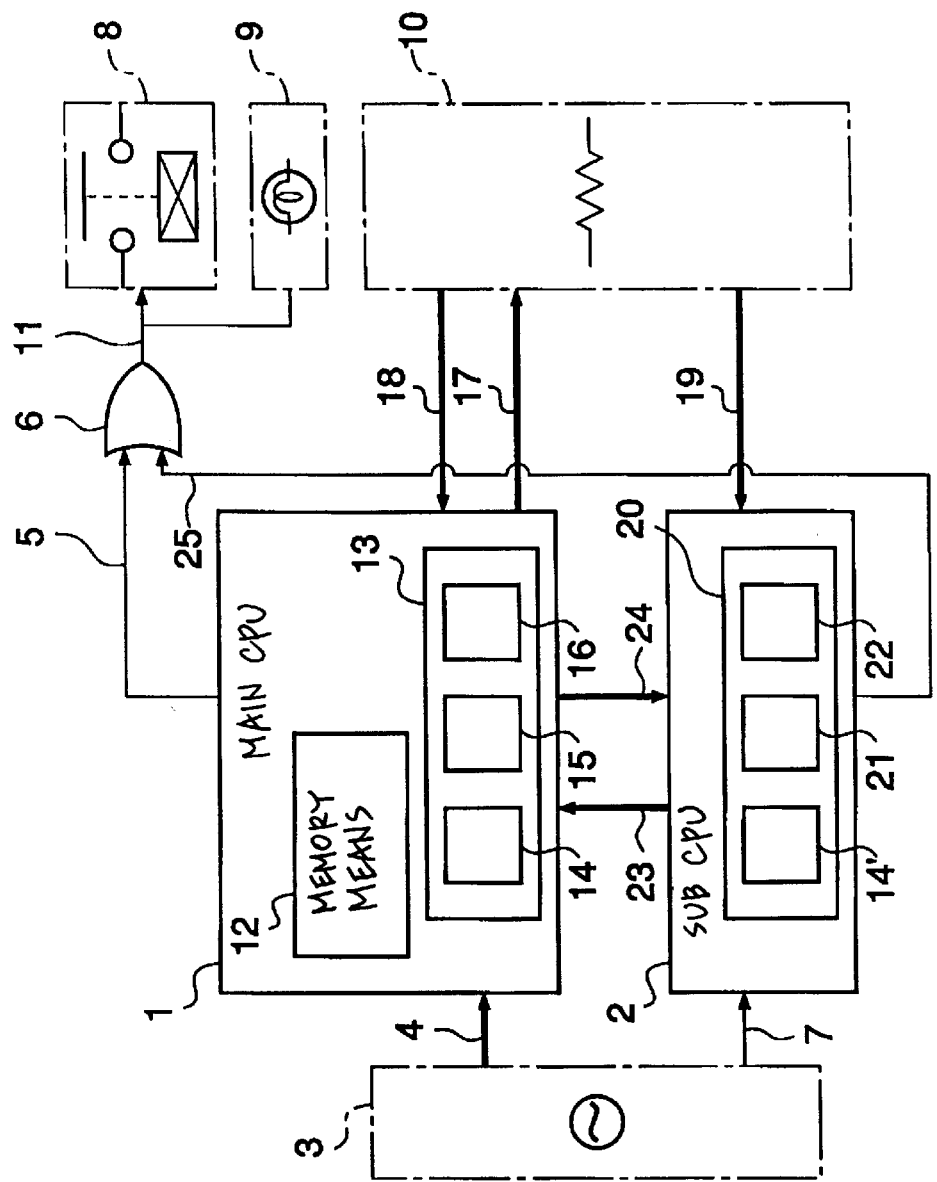
FIG. 1 is a block diagram showing the arrangement of a conventional ECU for an automotive vehicle.
Figure 2:
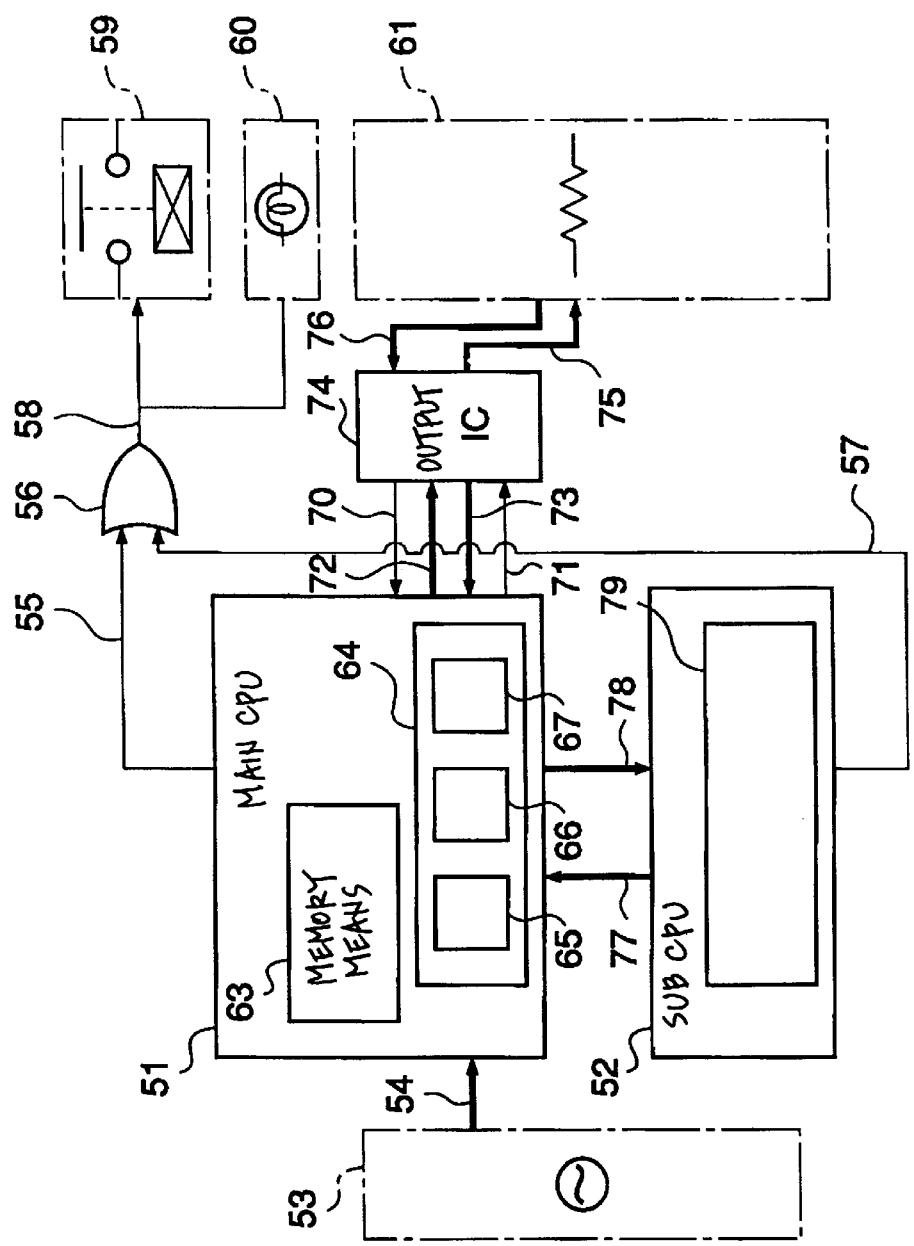
FIG. 2 is a block diagram showing the arrangement of an ECU for an automotive vehicle according to a first embodiment of the present invention

The invention will be described in detail with reference to the drawings showing embodiments thereof. Referring first to FIG. 2, there is shown the arrangement of an ECU for an automotive vehicle according to a first embodiment of the invention. The ECU shown in FIG. 1 carries out ABS control. In the figure, the ECU is comprised of a main CPU 51 which is formed by a microprocessor to serve as a processor, and a sub CPU 52 which serves as monitoring means.

Connected to an input of the main CPU 51 by way of a signal line 54 is an output of a wheel speed sensor 53 as an external sensor for outputting a wheel speed signal WS, while an input of an OR circuit 56 is connected to an output of the main CPU 51 by way of a signal line 55.

The other input of the OR circuit 56 is connected to an output of the sub CPU 52 by way of a signal line 57. An output of the OR circuit 56 is connected to a fail-safe relay 59 and an alarming lamp 60 by way of a signal line 58. The fail-safe relay 59, when activated, cuts off the supply of electric power to a solenoid valve 61 which is used as an actuator, as explained later, while the alarming lamp 60, when turned on, indicates the occurrence of an abnormality in ABS control, as explained later, and warns a driver of the occurrence of the abnormality.

The main CPU 51 includes a first memory means 63 which is formed by a ROM. The first memory means 63 stores control programs for carrying out arithmetic processing executed by the main CPU 51.

The main CPU 51 is provided with a CPU core 64 which performs arithmetic processing on control programs. The CPU core 64 is comprised of a wheel speed signal-processing block 65 which executes necessary processing such as filtering of a wheel speed signal WS fed to the main CPU 51 from the wheel speed sensor 53 and generates a vehicle speed signal VS' based on the wheel speed signal WS, an ABS control block 66 which executes ABS control in response to the wheel speed signal WS and the vehicle speed signal VS' estimated from the wheel speed signal WS, and a solenoid valve control block 67 which executes control of the solenoid valve 61 in response to a control signal fed from the ABS control block 66.

The CPU 51 is connected to an output IC 74 by way of a plurality of communication lines 70, 71, 72 and 73. The output IC 74 is connected to the solenoid valve 61 by way of communication lines 75 and 76.

The communication line 70 is provided for transmitting a fail signal indicative of a failure of the solenoid valve 61 to the main CPU 51, as described later, while the communication line 71 is provided for transmitting an output-inhibiting signal to the output IC 74 from the main CPU 51, as described later. The communication lines 72 and 73 are provided for transmitting a control signal for operating the solenoid valve 61 and a signal which indicates the operative state of the solenoid valve 61 responsive to the control signal, using an eight-bit serial communication of a clock-synchronous type The output IC 74 receives a solenoid valve-operating control signal from the main CPU 51 by way of the communication lines 72 and 73 using the eight-bit serial communication, and controls the operation of the the solenoid valve 61 by way of the communication line 75, and delivers back a signal indicative of the operative state of the solenoid valve 61 which is a result of its response to the solenoid valve-operating control signal, to the main CPU 51 by way of the communication line 73. The solenoid valve 61 regulates the brake pressure of a brake system of the automotive vehicle in response to the control signal fed from the output IC 74. The output IC 74 is adapted to detect abnormalities, namely, an abnormality that the solenoid valve 61 is held on, an abnormality that the valve 61 is held off, and an abnormality in the serial communication by way of the communication lines 72 and 73. When any of the abnormalities is detected, the output IC 74 delivers a fail signal to the main CPU 51 by way of the communication line 70.

The sub CPU 52 is a microprocessor which monitors the entire system including the main CPU 51. The sub CPU 52 is provided with a main CPU-monitoring block 79 as determining means for monitoring the operation of the main CPU 51.

The main CPU 51 and the sub CPU 52 are connected with each other by way of communication lines 77 and 78 for transmitting and receiving data therebetween.

The operation of the ECU according to the first embodiment constructed above will be explained hereinbelow.

First, the wheel speed signal WS is input to the main CPU 51 from the wheel speed sensor 53 by way of the signal line 54.

Then, the main CPU 51 executes the following processing using control programs stored in the memory means 63:

The wheel speed signal-processing block 65 processes the wheel speed signal WS fed from the wheel speed sensor 53. During this processing, if an abnormality has been detected in the output from the wheel speed sensor 53, the signal-processing block 65 delivers a fail-safe signal to the OR circuit 56 by way of the signal line 55.

The ABS control block 66 executes arithmetic processing related to ABS control in response to the wheel speed signal WS processed in the wheel speed signal-processing unit 65 and the vehicle speed signal VS' estimated from the wheel speed signal WS. During this processing, if an abnormality has been detected in the operation of the ABS control block 66, the control block 66 delivers a fail-safe signal to the OR circuit 56 by way of the signal line 55.

The solenoid valve control block 67 operates based on results of the calculation of the ABS control block 66 and a response from the solenoid valve 61 which will be described later, to deliver a control command signal to the output IC 74 so as to control the operation of the solenoid valve 61 by way of the communication lines 72 and 73 using an eight-bit serial communication of a clock-synchronous type.

The output IC 74 operates in response to the received control command signal from the main CPU 51 to generate a control signal for the solenoid valve 61 and transmits the control signal to the the solenoid valve 61 by way of the communication line 75.

In response to the control signal transmitted from the output IC 74, the solenoid valve 61 regulates the brake pressure and delivers a signal indicative of its own operative state which rejects its response to the control signal, to the output IC 74 by way of the communication line 76.

The OR circuit 56 activates the fail-safe relay 59 and turns on the alarm lamp 60 by way of the signal line 58 in response to the fail-safe signals transmitted, respectively, from the wheel speed signal-processing block 65, the ABS control block 66 and the solenoid valve control block 67. Thus, the supply of electric power to the solenoid valve 61 is cut off and the driver of the vehicle is warned of occurrence of an abnormality.

In the above-mentioned fail-safe processing by each block, the main CPU 51 delivers an output-inhibiting signal to the output IC 74 by way of the communication line 71 and then the output IC 74 disables the solenoid valve 61 accordingly. This control system for the solenoid valve 61 including the communication line 71 constitutes a redundancy circuit for the above-mentioned fail-safe circuit for the solenoid valve 61 formed by the fail-safe relay 59.

Figure 3:
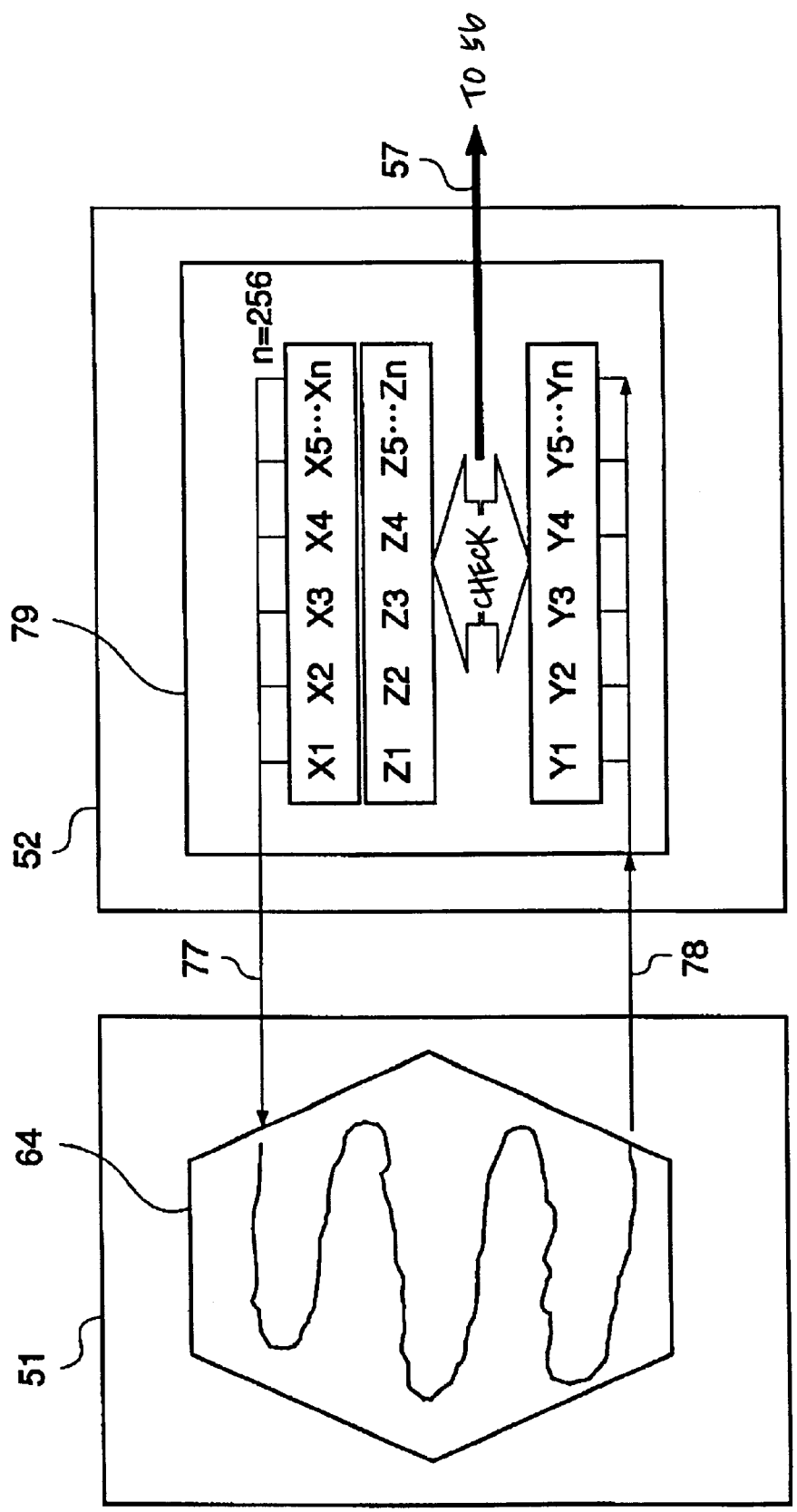
FIG. 3 is a view useful in explaining a manner of core checking executed by a main CPU-monitoring block of a sub CPU of the FIG. 2 embodiment.

The sub CPU 52 executes the following processing at the main CPU-monitoring block 79:

In FIG. 3, a manner of core check executed by the main CPU-monitoring block 79 of the sub CPU 52 is schematically shown. In the figure, component elements which are identical or corresponding in function to those appearing in FIG. 2 are designated by the same reference numerals and description of these component elements is omitted.

The sub CPU 52 includes a ROM as a second memory means which stores check data X1 to Xn (n=256 and "n" assumes the same value hereinafter) used for checking the operation of the main CPU 51 and solutions Z1 to Zn determined, respectively, by the check data X1 to Xn. The check data X1 to Xn are set to X1=01h, X2=02h, ... Xn=00h (n is set to 256 if the basic unit length of the check data is 8 bits, and the same value of "n" also applies to the solutions Z and resulting data Y), respectively, and the solutions Z1 to Zn are set to Z1=F9h, Z2=FAh, Zn=F8h, respectively. The basic unit length of the check data and that of the solutions are 8 bits regardless of the hardware structure of the main CPU 51 (e.g. 8 bits microprocessor, 16 bits microprocessor, and 32 bits microprocessor).

First, the check data X1 to Xn stored in the ROM of the sub CPU 52 are delivered to the main CPU 51 by way of the communication line 77 in a serial and cyclic manner. The main CPU 51 executes a predetermined calculation using a calculation formula which is read out from the first memory means 63 to the CPU core 64 which performs arithmetic processing executed by the main CPU 51, based on the check data X1 to Xn fed from the sub CPU 52 and delivers resulting data Y1 to Yn (Y1=F9h, Y2=FAh, ... Yn=F8h) back to the sub CPU 52 by way of the communication line 78. Then, the solutions Z1 to Zn stored in the ROM of the sub CPU 52 and the resulting data Y1 to Yn are compared with each other by the sub CPU 52. If the resulting data Y1 to Yn do not coincide with the solutions Z1 to Zn, respectively, the sub CPU 52 determines that the CPU core 64 of the main CPU 51 is malfunctioning and transmits a fail-safe signal to the OR circuit 56 by way of the signal line 57. Then, the OR circuit 56 activates the fail-safe relay and turns on the alarm lamp 60. The check data X1 to Xn and the solutions Z1 to Zn stored in the ROM of the sub CPU 52 can be directly applied, without being modified, for checking operation of the microprocessors of other control systems (e.g. TCS control system, EFI control system, and others) than the ABS control system, so far as the microprocessors of the other control systems have the same specifications as the main CPU 51.

According to the first embodiment described above, the main CPU-monitoring block 79 in the sub CPU 52, which monitors the main CPU 51, need not have the same or similar arithmetic function executed by the main CPU 51 but simply stores the check data (X1 to Xn) and the solutions (Z1 to Zn) determined by the check data such that it has only to check or compare the resulting data (Y1 to Yn) with the solutions (Z1 to Zn). Further, so far as the microprocessors of the other control systems have the same specifications as the main CPU 51, even if they have different arithmetic algorithms, such as an ECU for ABS and an ECU for TCS, the structure of the main CPU-monitoring block 79 (i.e., hardware structure (e.g. a processor which executes only a simply function of checking the resulting data (Y1 to Yn)

with the solutions (Z1 to Zn)), and the check data and the solutions (i.e., X1 to Xn ,and z1 to Zn)) can be directly applied to the other control systems as well.

Since the main CPU-monitoring block 79 with the common structure can thus be directly applied to the other control systems, the present invention provides versatility to different ECUs irrespective of applications and greatly reduces the development cost and manufacturing cost of ECUs.

In the above embodiment, while the main CPU 51 is a relatively expensive microprocessor capable of quickly processing a complicated arithmetic processing, the microprocessor constituting the sub CPU 52 can be an inexpensive microprocessor that can merely check two kinds of data since it does not perform complicated arithmetic processing.

Figure 4:
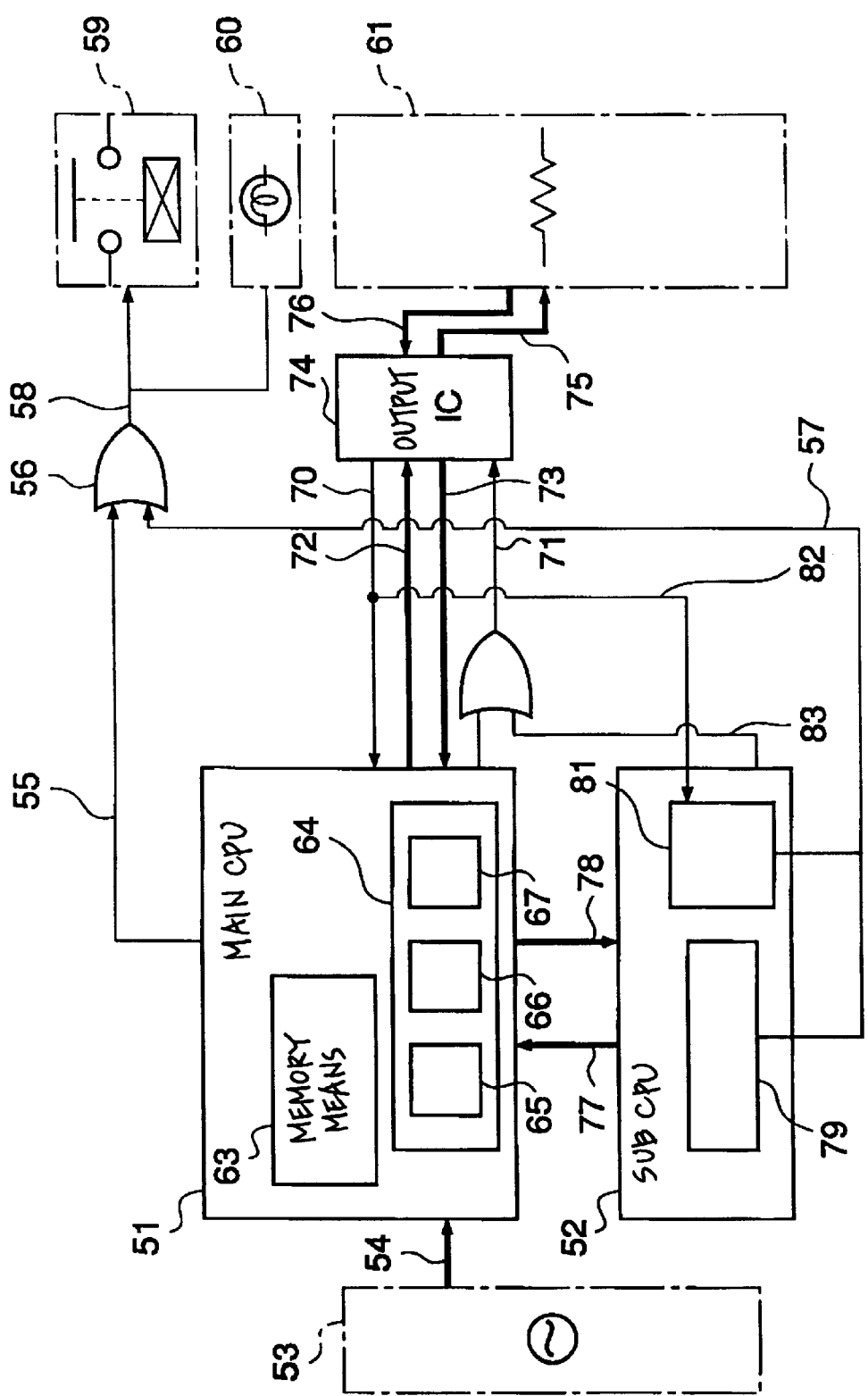
FIG. 4 is a block diagram showing the arrangement of an ECU for an automotive vehicle according to a second embodiment of the present invention.

A second embodiment of the invention will be described hereinbelow with reference to FIG. 4. In the figure, the arrangement of an ECU for an automotive vehicle according to the second embodiment is shown, which performs ABS control. In the figure, component elements identical or corresponding in function to those appeared in FIG. 2 are designated by the same reference numerals and description of these elements is omitted.

The second embodiment is distinguished from the first embodiment shown in FIG. 2 in that the sub CPU 52 is further provided with a solenoid valve-monitoring means 81 which monitors the status or operative state of the solenoid valve 61. The solenoid valve-monitoring means 81 is connected to the communication lines 70 and 71 respectively by way of communication lines 82 and 83.

The solenoid valve-monitoring means 81 monitors the operation of the solenoid valve 61 to determine an abnormality in the solenoid valve 61 including an abnormality in the communication, based on the fail signal from the solenoid valve 61 through the communication lines 70 and 82. When an abnormality of the solenoid valve 61 is detected, the solenoid valve-monitoring means 81 delivers an output-inhibiting signal to the output IC 74 by way of the communication lines 83 and 71 to inhibit the operation of the output IC 74, while the monitoring means 81 delivers a fail-safe signal to the OR circuit 56 by way of the signal line 57, whereby the supply of power to the solenoid valve 61 is cut off and the alarm lamp 60 is turned on.

Therefore, according to the second embodiment, in addition to monitoring the operation of the main CPU 51, monitoring of abnormality of the solenoid valve 61 can be achieved, and in the event of an abnormality of the solenoid valve 61, the operation of the valve 61 can be inhibited.

Figure 5:
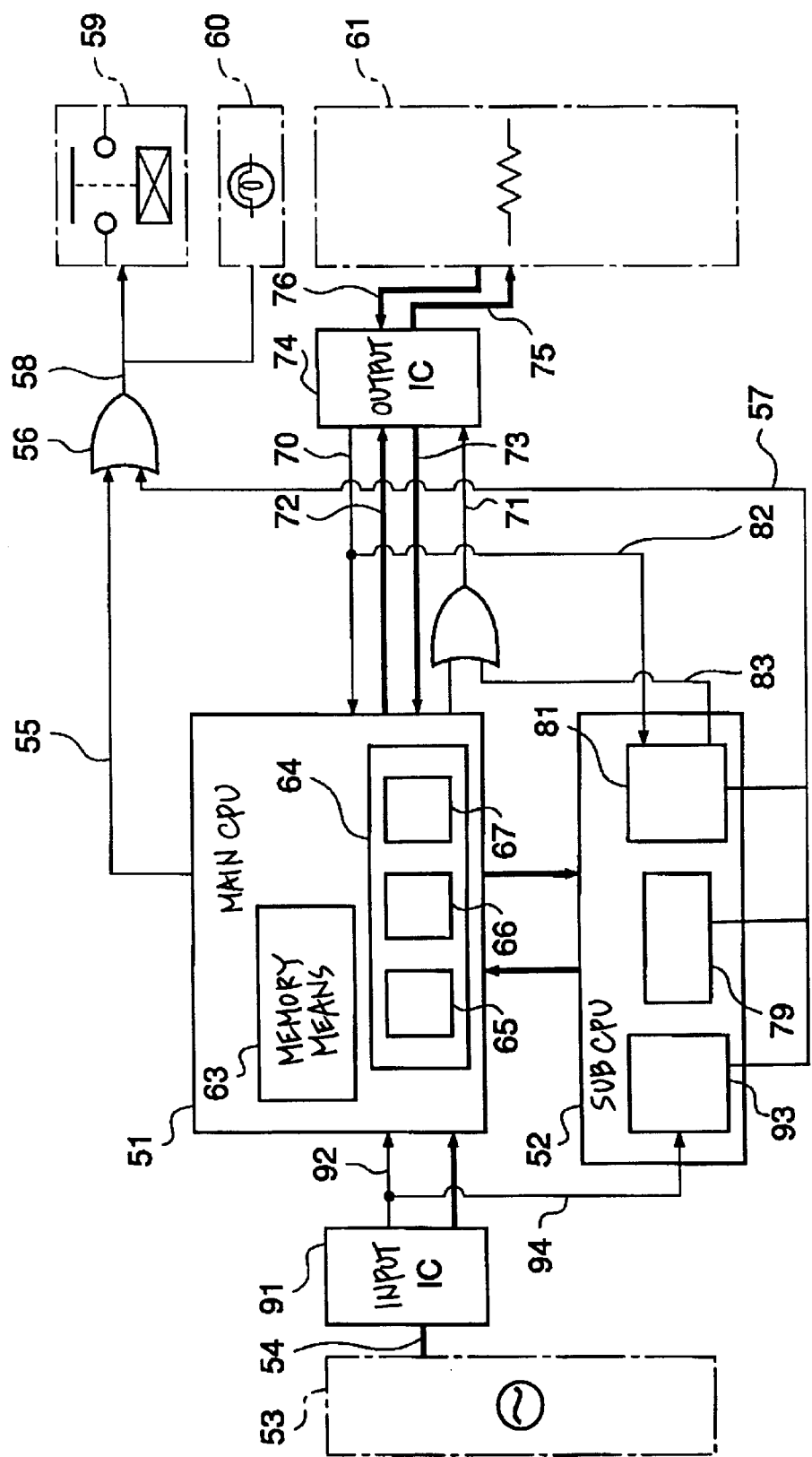
FIG. 5 is a block diagram showing the arrangement of an ECU for an automotive vehicle according to a third embodiment of the present invention.

A third embodiment of the present invention will be described hereinbelow with reference to FIG. 5. In the figure, an ECU for an automotive vehicle according to the third embodiment for carrying out ABS control is shown. Also in FIG. 5, component elements identical or corresponding in function to those appeared in FIG. 2 are designated by the same reference numerals and description of these elements is omitted.

In the third embodiment, an input IC 91 is provided in the midst of the signal line 54 which connects the wheel speed sensor 53 to the main CPU 51. The input IC 91 first shapes the waveform of the wheel speed signal WS from the wheel speed sensor 53 and then determines whether an abnormality such as a disconnection in the sensor 53 or its wiring has occurred. If such an abnormality is detected, the input IC 91 delivers a fail signal to the main CPU 51 by way of a communication line 92. Further, a wheel speed sensor-monitoring means 93 is provided in the sub CPU 52, which monitors the operation of the wheel speed sensor 53. The wheel speed sensor-monitoring means 93 is connected to the communication line 92 by way of a communication line 94.

The wheel speed sensor-monitoring means 93 monitors the operation of the wheel speed sensor 53, based on a fail signal indicative of the operation of the wheel speed sensor 53 transmitted from the input IC 91. Namely, when an abnormality of the output from the wheel speed sensor 53 is detected, the monitoring means 93 delivers an output-inhibiting signal to the output IC 74 by way of the communication line 83 to inhibit the operation of the output IC 74 and at the same time delivers a fail-safe signal to the OR circuit 56 by way of the communication line 57 to activate the fail-safe relay 59 so that the supply of power to the solenoid valve 61 is cut off and the alarm lamp 60 is turned on. Thus, according to the third embodiment, in addition to monitoring the operation of the main CPU 51, monitoring of abnormality of the wheel speed sensor 53 can be achieved, and in the event of an abnormality of the wheel speed sensor 53, the operation of the solenoid valve 61 can be inhibited.

Although the ECUs of the above described first to third embodiments are used for the ABS system, they may be used for other control systems such as an electronic fuel ignition control system (EFI) and a traction control system (TCS).

As described heretofore, according to the present invention, the second memory means stores in advance check data for checking the microprocessor and solutions determined by the check data, and the determining means compares results of the arithmetic processing executed by the microprocessor based on the check data with the stored solutions and judges that the microprocessor is malfunctioning if results of the arithmetic processing of the microprocessor and the stored solutions do not agree. This can dispense with provision of an arithmetic processing function exclusively for monitoring purposes for the monitoring means which monitors the microprocessor. That is, it suffices that the monitoring means stores check data for monitoring and solutions determined by the check data. Furthermore, monitoring means having a common structure can be used with microprocessors having different applications, thus imparting versatility to different ECUs irrespective of applications and greatly reduces the development cost and manufacturing cost of ECUs.

According to the present invention, abnormality of an actuator driven by the microprocessor can also be monitored in addition to monitoring abnormality of the microprocessor and the operation of the actuator can be readily inhibited upon detection of the occurrence of abnormality of the actuator.

Further, according to the present invention, abnormality of an external sensor or external sensors for detecting parameters used for the control can also be monitored in addition to monitoring of abnormality of the microprocessor and the operation of the actuator can be readily inhibited upon detection of the occurrence of abnormality of the external sensor(s).

What is claimed is:

1. An electronic control unit for an automotive vehicle, comprising:

a microprocessor having first memory means for storing one of a plurality of predetermined arithmetic programs for controlling respective predetermined control systems, said microprocessor being connected to at least one external sensor and an actuator of a corresponding one of said predetermined control systems, said microprocessor arithmetically processing information from said at least one external sensor based on said one of said plurality of predetermined arithmetic programs stored in said first memory means, and said microprocessor delivering a control signal as a result of said arithmetic processing to said actuator; and monitoring means connected to said microprocessor, for delivering and receiving data to and from said microprocessor and thereby monitoring operation of said microprocessor, wherein said monitoring means includes: (i) second memory means for storing both check data for checking said operation of said microprocessor, based on which said microprocessor executes predetermined arithmetic processing, and solutions determined by said check data, said check data being directly applicable, without being modified, for checking operations of microprocessors of all of the predetermined control systems operating on different arithmetic programs, and (ii) determining means for comparing between results of said predetermined arithmetic processing executed by said microprocessor based on said check data and said solutions stored in said second memory means, and for determining that an abnormality exists in said microprocessor when said results of said predetermined arithmetic processing and said solutions do not agree.

2. An electronic control unit as claimed in claim 1, wherein said monitoring means includes output means, connected to said actuator of said control system, for outputting a signal commanding inhibition of operation of said actuator when said determining means determines that said abnormality exists in said microprocessor.

3. An electronic control unit as claimed in claim 1, including input means for inputting a signal indicative of operation of said actuator to said monitoring means.

4. An electronic control unit as claimed in claim 3, wherein said monitoring means includes output means for outputting a signal commanding inhibition of said operation of said actuator when said signal indicative of said operation of said actuator indicates that an abnormality exists in said actuator.

5. An electronic control unit as claimed in claim 1, including input means for inputting a signal indicative of operation of said at least one external sensor to said monitoring means.

6. An electronic control unit as claimed in claim 5, wherein said monitoring means includes output means for outputting a signal commanding inhibition of operation of said actuator when said signal indicative of said operation of said at least one external sensor indicates that an abnormality exists in said at least one external sensor.

7. An electronic control unit for an automotive vehicle, comprising:

a first microprocessor having first memory means for storing one of a plurality of predetermined arithmetic programs for controlling respective predetermined control systems, said first microprocessor being connected to at least one external sensor and an actuator of a corresponding one of said predetermined control systems, said first microprocessor arithmetically processing information from said at least one external sensor based on said one of said plurality of predetermined arithmetic programs stored in said first memory means, and said first microprocessor delivering a control signal as a result of said arithmetic processing to said actuator; and a second microprocessor connected to said first microprocessor exclusively for delivering and receiving data to and from said first microprocessor and thereby monitoring operation of said first microprocessor;

wherein said second microprocessor includes: (i) second memory means for storing both check data for checking said operation of said first microprocessor, based on which said first microprocessor executes predetermined arithmetic processing, and solutions determined by said check data, said check data being directly applicable, without being modified, for checking operations of microprocessors of all of the predetermined control systems operating on different arithmetic programs, and (ii) determining means for comparing between results of said predetermined arithmetic processing executed by said first microprocessor based on said check data and said solutions stored in said second memory means, and for determining that an abnormality exists in said first microprocessor when said results of said predetermined arithmetic processing and said solutions do not agree.

* * * * *